(No Model.)

M. FULTON.
CAR FENDER.

No. 556,410.

3 Sheets—Sheet 1.

Patented Mar. 17, 1896.

Witnesses.

Inventor.

(No Model.) 3 Sheets—Sheet 2.

M. FULTON.
CAR FENDER.

No. 556,410. Patented Mar. 17, 1896.

Witnesses. Inventor.
Mahlon Fulton
per John F. Nolan
Attorney.

(No Model.)  M. FULTON.  3 Sheets—Sheet 3.
CAR FENDER.

No. 556,410.  Patented Mar. 17, 1896.

Witnesses.  Inventor.

UNITED STATES PATENT OFFICE.

MAHLON FULTON, OF PHILADELPHIA, PENNSYLVANIA.

CAR-FENDER.

SPECIFICATION forming part of Letters Patent No. 556,410, dated March 17, 1896.

Application filed February 1, 1895. Serial No. 536,908. (No model.)

*To all whom it may concern:*

Be it known that I, MAHLON FULTON, a citizen of the United States, residing at the city and county of Philadelphia and State of Pennsylvania, have invented certain new and useful Improvements in Car-Fenders, of which the following is a full, clear, and exact description, reference being had to the accompanying drawings, forming a part of this specification.

The object of this invention is to provide a car-fender which shall meet the varied requirements of such a structure, the construction, organization, and functions of the several parts being hereinafter fully described, reference being had to the annexed drawings, of which—

Figure 1:
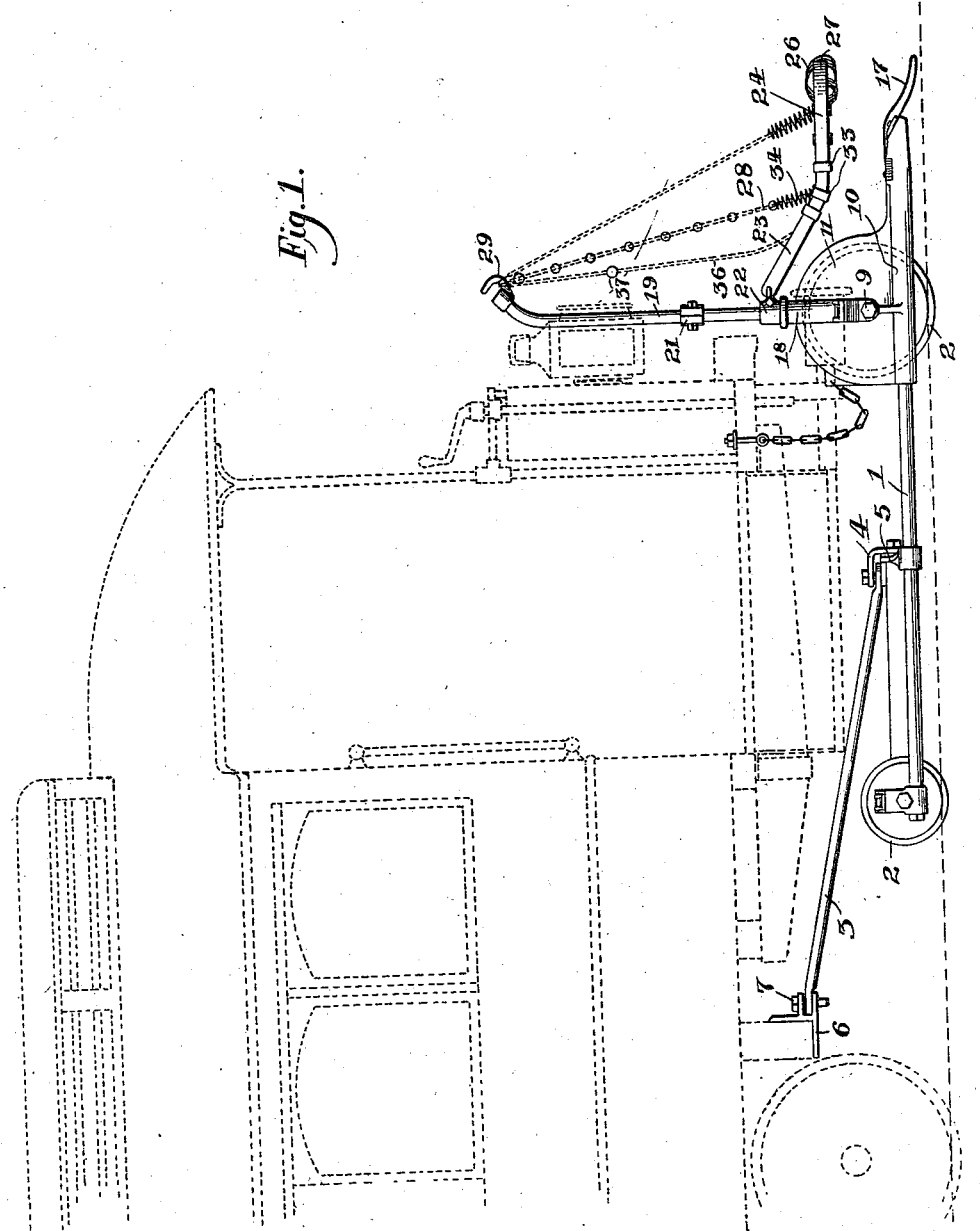
Figure 2:
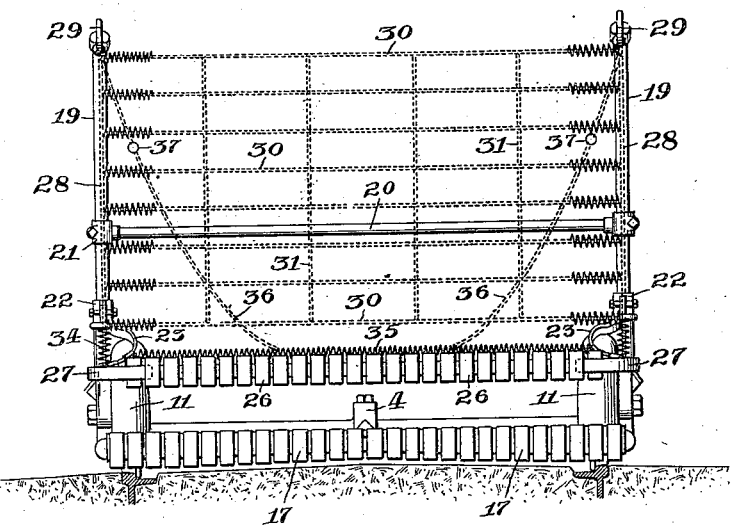
Figure 3:
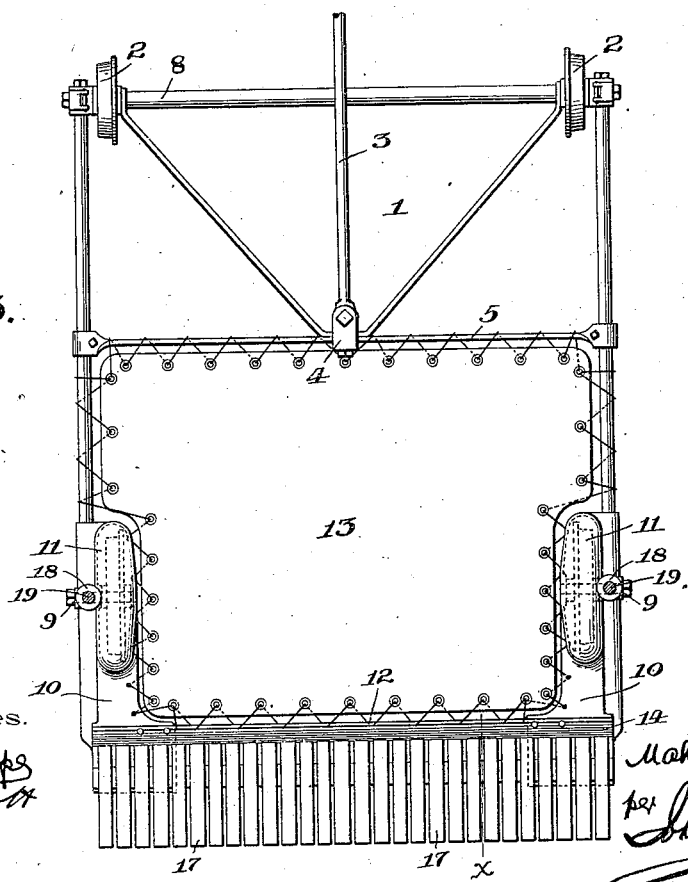
Figure 4:
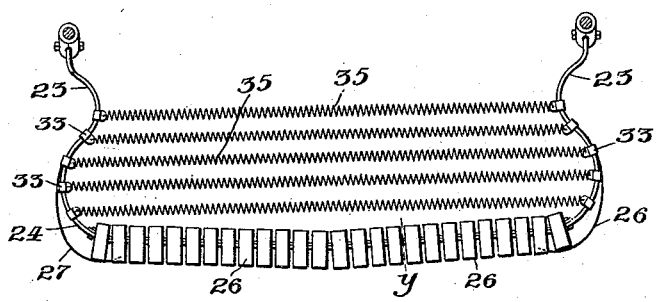
Figure 5:
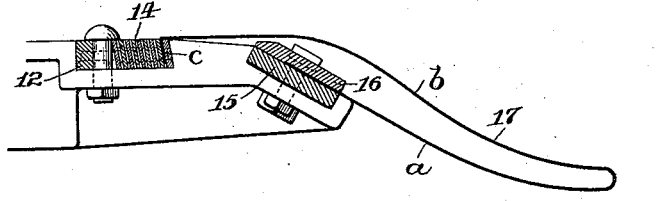
Figure 7:
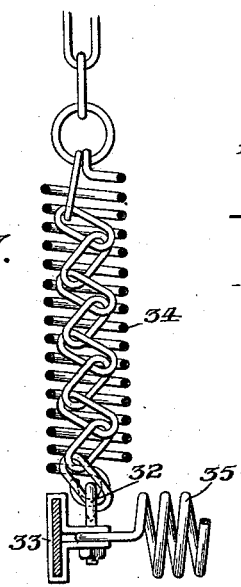
Figure 6:
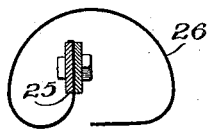
Figure 8:
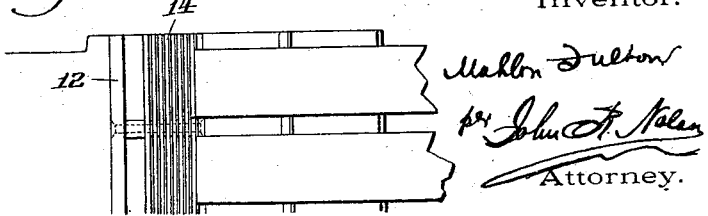

Figure 1 is a side elevation of the fender as applied to the forward portion of a car. Fig. 2 is a front elevation of the fender detached. Fig. 3 is a plan of the fender-truck. Fig. 4 is a plan of the upper-fender section. Fig. 5 is an enlarged sectional detail as on the line $x$ of Fig. 3. Fig. 6 is a similar detail as on the line $y$ of Fig. 4. Fig. 7 is a sectional detail of the upper fender. Fig. 8 is a detail of one of the forward corners of the lower or truck fender.

The numeral 1 designates a truck, the wheels 2 of which are constructed and arranged to run on the rails of the trackway. This truck is located at the forward end of the car, being connected with the latter by means of a rearwardly-extending push-rod 3. The forward end of this rod is pivotally connected with a bracket 4 on a transverse bar 5 of the truck-frame, while the rearward end of the rod is similarly connected with a bracket 6 affixed to the bottom of the car-body. An attachable and detachable pin 7 is used to connect the rod with the bracket 6, to the end that said rod, together with the truck and its appurtenances, may be readily applied to or disconnected from the car.

The rearward wheels of the truck are loosely mounted on an axle 8, while the forward wheels thereof are mounted on studs 9 in a frame-section 10, forming the leading portion of the truck, which portion projects in advance of the car. The frame is provided with suitable housings 11, that incase the wheels. Between the bar 5 and a cross-bar 12 on the forward part of the truck-frame is stretched a web of canvas 13 or other suitable fabric, the same being preferably, though not essentially, held in position by lacing it to the bars and the sides of the truck-frame, as seen most clearly in Fig. 4. This canvas affords a yielding elongated platform or receptacle for a purpose hereinafter appearing.

It will be observed that the forward wheels of the truck are much larger than the rearward or "trailer" wheels, so as to secure the greater weight at the forward end of the truck, and, further, that the trailer-wheels are arranged considerably rearward of the forward wheels, so as to obviate all liability of their jamming between or riding upon the rails while rounding a curve. Moreover, as the trailer-wheels are in rear of the steps, as seen, there is no danger of the step striking these wheels while the car is traversing a curve.

To the bar 12 of the truck-frame is bolted a series of transverse plates 14, which are arranged side by side, but slightly apart, so as to form a series of parallel inclined interspaces, as illustrated.

The forward end of the frame-section 10 is drooped, the side members thereof being connected by a cross-bar 15. Clamped to this bar by means of a superposed bar 16 are the adjacent ends of a series of peculiarly-formed springs 17, the other ends thereof being adjustably connected with the plates 14 in a manner presently explained. Each of the springs is the form shown in Figs. 1 and 5, or substantially so—that is to say, it curves forwardly and downwardly in proximity to the road-bed, as at $a$, and then upwardly and rearwardly, as at $b$, so as to clear the clamp-bar. The rear extremity of the spring is bent downward to form a lip $c$, which may be engaged with any of the interspaces between the plates 14, so as to retain in place the rear portion of the spring. It will be obvious that if the lip be applied to a rear interspace the nose of the spring will be higher than if the lip were engaged with a forward interspace, thus permitting ready adjustment of the spring in reference to the road-bed. The springs being independently adjustable in this manner the series may be set to conform to the general contour of the road-bed. By reason of their peculiar form and independent action should any of the springs come in contact with a fixed obstruction—such, for example, as a manhole-cover or a raised paving-stone—the spring will pass uninjured over the same—that is to say, the action of the obstruction upon the advancing nose will naturally force the spring inward and thus cause the under portion $a$ thereof to bow downward until it strikes the ground, whereupon the nose of the spring being directed upward will rebound over the obstruction and the spring will resume its normal position. Hence the springs may be set very near to the ground to the end that they will pass harmlessly under a prostrate body and direct the same upon the canvas platform of the truck, which platform, being elongated, as shown and stated, will receive the person even should he be lying lengthwise of the trackway. Should the person encountered be standing, the impact will be at the heel.

Rising from socketed posts 18 on the respective sides of the frame 10, slightly in advance of the car-body, are vertical bars or standards 19, which are connected directly above the bumper of the car by means of a cross-bar 20, so as to form a rigid and substantial structure. The ends of this bar are fastened to the standards by clamp-fittings 21, so that the bar may be vertically adjusted on the standards, as desired.

Pivoted to collars 22 on the standards, immediately above the lateral posts 18, are the arms 23 of a forwardly-extending fender-frame 24 of thin spring metal, the said arms being preferably of the duplex bow form shown to insure a high degree of flexibility and thus reduce the liability of breakage in case of collision. Clamped to the forward member of the frame 24, by means of a bar 25, is a series of forwardly-extending curved springs 26, arranged side by side, which afford a yielding cushion to receive the impact.

Fastened to the forward portions of the arms 23 are the rear ends of bow-shaped springs 27, the forward ends of which are sprung into the adjacent corner-springs 26 in a manner to provide yielding guards at the corners of the frame 24. This frame is suspended by means of chains 28 connected with the standards 19 and with hooks 29 on the upper ends of the standards, the rearward chains being connected by means of cross-chains 30, and the latter being in turn connected by vertical chains 31, thus constituting a web-like structure. The chains 28 are linked to hooks 32 fastened to clasps or brackets 33 on the lateral arms of frame 24, the lower portion of each chain being encircled by a spiral spring 34, which is secured at its upper end to a link of the chain and at its lower end to the hook. The lower portions of these chains are loosely confined within the springs, the latter thus yieldingly sustaining the frame 24. Hence when the frame is depressed the springs are expanded until the confined portions of the chains are drawn taut. The ends of the cross-chains 30 are provided with springs connected with the suspension-chains similarly to the connections of the latter with the side bars just described. These spring-controlled chains effectually fend the dashboard of the car, yet permit the rays to shine from the usual head-light without perceptible obstruction. The lateral arms of frame 24 are connected by means of a series of spiral springs 35, which afford an elastic seat into which a person will fall should he be struck while in an upright position. As these seat-springs are fastened at their extremities only, they admit a body to wedge between them, and thus hold the person securely and without injury.

As the frame 24 is hingedly connected with the standards, as above explained, said frame may be folded up to allow the cars to be stored bumper to bumper, and, also, when a car is disabled along the route to permit the following car to be readily coupled therewith. A simple means whereby the frame may be folded up by the operative comprises chains 36 connected with the springs 35, said chains being provided with eyes 37 that may be engaged with the hooks on the standards when the frame is raised.

By the foregoing-described construction it will be seen that the fender is an independent structure, and, therefore, that its form is not prescribed by that of any particular construction of car; that the fender being practically free of the car-body is unaffected by the oscillations of the car, and that, consequently, the fender under all conditions occupies the same position in respect to the road-bed, and, further, that the fender being supported upon and being a part of a truck that is pivotally propelled by a push-rod, the structure rounds a curve following closely the sweep of the track and not the swing of the car-body, thereby avoiding danger of collision and insuring protection across the curve as well as upon the straight track. It will also be seen that the upper fender-section may be readily removed from and applied to the standards, as occasion may require, and, moreover, that the several parts of the structure may be readily detached and attached at will.

I claim—

1. In a car, a fender comprising an independent four-wheeled truck, the major part of which is located under the forward portion of the car with the rear wheels occupying a position rearward of the car-steps, and the lesser part of said truck extending forwardly from the car, a push-rod having one end pivotally connected with the said truck at a point in advance of the rearward wheels and having its other end pivotally connected with the car, a platform or receptacle on said truck, and an elastic or yielding section on the forward end of the truck, substantially as described.

2. In a car, a fender comprising an independent four-wheeled truck, the major part of which is located under the forward portion of the car with the rear wheels occupying a position rearward of the car-steps, and the lesser part of said truck extending forwardly from the car, a push-rod having one end pivotally connected with the said truck at a point in advance of the rearward wheels and having its other end connected with the car, a platform or receptacle on said truck, and a series of independent scoop-like springs connected with the forward end of the truck and constructed to project downward and forward therefrom, substantially as described.

3. In a car, a fender comprising an independent four-wheeled truck, the major part of which is located under the forward portion of the car with the rear wheels occupying a position rearward of the car-steps, and the lesser part of said truck extending forwardly from the car, a push-rod having one end pivotally connected with the said truck at a point in advance of the rearward wheels and having its other end connected with the car, a platform or receptacle on said truck, and a series of forwardly and rearwardly extending springs having their under ends fixedly fastened to the truck in advance of the platform and their upper ends adjustably fastened thereto, substantially as described.

4. In a car-fender, the combination of a truck or support with a platform thereon, and a series of forwardly and rearwardly extending springs having their under and upper ends fastened to the truck or support, substantially as described.

5. In a car-fender, the combination of a truck or support provided with a series of parallel separated bars on the forward part thereof, a series of forwardly and rearwardly extending springs having their under ends fastened to the truck or support in advance of the bars, and being provided on their upper ends with lips which are detachably fitted to the spaces between the bars, substantially as described.

6. In a car, a fender comprising an independent four-wheeled truck, the major part of which is located under the forward portion of a car, with the rear wheels occupying a position rearward of the car-steps, and the lesser part of said truck extending forwardly beyond the car and being provided with housings in which the forward wheels are mounted, a push-rod having one end pivotally connected with a cross-rod on said truck in advance of the rearward wheels, and having its other end pivotally connected with the car, and a platform or receptacle on said truck, substantially as described.

7. In a car, a fender comprising an independent four-wheeled truck, the major part of which is located under the forward portion of the car with the rear wheels occupying a position rearward of the car-steps, and the lesser part of said truck extending forwardly from the car and being provided with housings in which the forward wheels are mounted, a push-rod having one end pivotally connected with a cross-rod on said truck in advance of the rearward wheels, and having its other end pivotally connected with the car, and a platform or receptacle on said truck, together with a series of forwardly and rearwardly extending springs having their under and upper ends fastened to the truck or support, substantially as described.

8. In a car-fender, an independent four-wheeled truck having a frame-section at the forward end thereof in which section the two forward wheels are supported, in combination with a series of springs on the forward end of said section, each of said springs curving forwardly and downwardly in proximity to the road-bed and then upwardly and rearwardly, and having one end fixedly fastened to the said section and the other end adjustably fastened thereto, substantially as described.

9. In a car, a fender comprising an independent four-wheeled truck, the major part of which is located under the forward portion of the car with the rear wheels occupying a position rearward of the car-steps, and the lesser part of said truck extending forwardly beyond the car, a platform or receptacle on said truck, and an upwardly-extending fender-frame supported wholly upon said truck in advance of the car, the lower portion of the body of said frame being a suitable distance above the said platform or receptacle to permit the passage between the said frame and the platform of an object encountered, substantially as described.

10. A car-fender comprising an independent wheeled truck, the forward part of which embodies a frame-section formed with housings for the reception of the forward wheels of the truck, posts or standards rising from said housings, and a yielding material supported by said posts or standards, substantially as described.

11. A car-fender comprising an independent wheeled truck provided with a platform thereon, and pivotally connected with the car, an upwardly-extending fender-frame supported only by the truck in front of the car, the lower portion of the body of said frame being a suitable distance above the said platform to permit the passage between the said frame and the platform of the object encountered, substantially as described.

12. A car-fender comprising an independent wheeled truck provided with a platform thereon and pivotally connected with the car, lateral standards supported only by said truck in front of the car, a forwardly-extending frame hinged to said standards a suitable distance above the said platform to permit the passage between the frame and the platform of an object encountered, and a yielding fabric suspended from the standards and connected with the hinged frame, substantially as described.

13. In a car-fender, the combination of a vertical frame supported in front of a car, and an elastic frame hinged thereto, the sides of said latter frame being bow-shaped, substantially as described.

14. In a car-fender, the combination of a vertical frame supported in front of a car, a forwardly-extending frame hingedly connected with said frame and provided with the bottom springs, said springs being fastened at their extremities to the side arms of the hinged frame, substantially as described.

15. In a car-fender, a forwardly-extending frame supported in front of the car, and a series of independent forwardly - projecting curved springs embracing and shielding the forward bar of said frame and secured thereto by means of a clamp-bar, substantially as described.

16. In a car-fender, a forwardly-extending frame supported in front of the car, a series of independent forwardly-projecting curved springs embracing and shielding the forward bar of said frame, and bow-shaped springs having their rear ends secured to the lateral arms of the frame and their forward ends sprung into the adjacent springs of the series, substantially as described.

17. In a car-fender, a forwardly-extending elastic frame supported in front of a car, the sides of said frame comprising bow-shaped arms, the front thereof a series of independent curved springs, and the bottom a series of springs having their extremities fastened to the bow-shaped arms, substantially as described.

18. In a car-fender, a forwardly-extending elastic frame supported in front of a car, said frame comprising bow-shaped side bars, a series of independent curved springs on the front member of the frame, bow-shaped corner-springs fastened to the side bars, and a series of springs having their extremities fastened to the bow-shaped arms, substantially as described.

19. In a car-fender, a four-wheeled truck provided with a platform and with a forward section, the sides of which are connected by means of a cross-bar, a series of forwardly and rearwardly extending springs, the under ends of which are clamped to said bar and the upper ends of which springs are extended over said bar and connected with a rearward bar on said section, substantially as described.

20. In a car, a fender comprising an independent four-wheeled truck, the major part of which is located under the forward part of the car with the rear wheels occupying a position rearward of the car-steps, and the lesser part of said truck extending forwardly from the car and being provided with housings in which the forward wheels are mounted, a push-rod having one end pivotally connected with a cross-rod on said truck in advance of the rearward wheels, and having its other end connected with the car, a platform or receptacle extending from the said cross-bar to the forward cross-bar of the truck, a series of forwardly and rearwardly extending springs having their upper ends fixedly fastened to the truck in advance of the platform and their upper ends adjustably fastened thereto, posts or standards rising from the said housings, a forwardly-extending frame hinged to said standards a suitable distance above said platform and provided with a series of forwardly-projecting springs, and a yielding fabric suspended from the standards and connected with the hinged frame, substantially as described.

In testimony whereof I have hereunto affixed my signature in the presence of two subscribing witnesses.

MAHLON FULTON.

Witnesses:
MALINDA C. WASHINGTON,
BENTON O. SEVERN.